US012752846B2

(12) United States Patent
Kreis et al.

(10) Patent No.: US 12,752,846 B2
(45) Date of Patent: Oct. 6, 2026

(54) DRIVE UNIT FOR A WHEEL ACTUATOR OF A STEER-BY-WIRE SYSTEM FOR A VEHICLE, AND METHOD FOR DETERMINING THE POSITION OF THE CONTROL ROD OF A WHEEL ACTUATOR

(71) Applicant: Volkswagen Aktiengesellschaft, Wolfsburg (DE)

(72) Inventors: Christopher Kreis, Braunschweig (DE); Wassili Leibel, Schneverdingen (DE); Tobias Sachs, Wendeburg (DE)

(73) Assignee: Volkswagen Aktiengesellschaft, Wolfsburg (DE)

( * ) Notice: Subject to any disclaimer, the term of this patent is extended or adjusted under 35 U.S.C. 154(b) by 30 days.

(21) Appl. No.: 18/983,232

(22) Filed: Dec. 16, 2024

(65) Prior Publication Data

US 2025/0115296 A1 Apr. 10, 2025

Related U.S. Application Data

(63) Continuation of application No. PCT/EP2023/065542, filed on Jun. 9, 2023.

(30) Foreign Application Priority Data

Jun. 15, 2022 (DE) ..................... 10 2022 206 066.0

(51) Int. Cl.
*B62D 15/02* (2006.01)
*B62D 5/04* (2006.01)
*B62D 1/28* (2006.01)

(52) U.S. Cl.
CPC ......... *B62D 15/0235* (2013.01); *B62D 5/046* (2013.01); *B62D 15/0225* (2013.01); *B62D 1/28* (2013.01)

(58) Field of Classification Search
CPC ........................... B62D 15/0235; B62D 5/046; B62D 15/0225; B62D 1/28; B62D 5/04; B62D 5/0484; B62D 5/049; B62D 15/0245
See application file for complete search history.

(56) References Cited

U.S. PATENT DOCUMENTS 7,222,008 B2 5/2007 Takahashi et al.
8,925,509 B2 1/2015 Warfel et al.
(Continued)

FOREIGN PATENT DOCUMENTS

CN 106741139 A * 5/2017 ........... B62D 5/0409
CN 106741139 B * 11/2022 ........... B62D 5/0409
(Continued)

OTHER PUBLICATIONS

International Search Report dated Sep. 13, 2023 in corresponding application PCT/EP2023/065542.

*Primary Examiner* — Joseph J Dallo
(74) *Attorney, Agent, or Firm* — Muncy, Geissler, Olds & Lowe, P.C.

(57) ABSTRACT

A drive unit for a steer-by-wire system for a vehicle having a motor for providing a drive power to a control rod of the wheel actuator. A sensor device determines the position of the control rod, wherein the sensor device has a first sensor unit and at least one second sensor unit. The first sensor unit is designed to detect an angle of a rotor shaft of the motor, and the second sensor unit is designed to detect an angle of an auxiliary shaft which is mechanically operatively connected to the rotor shaft. A transmission device provides the mechanical operative connection between the rotor shaft and the auxiliary shaft. A controller actuates the sensor device and/or determines the position of the control rod of the wheel actuator. The first sensor unit and second sensor unit use different measuring principles.

14 Claims, 2 Drawing Sheets

(56) References Cited

U.S. PATENT DOCUMENTS

| | | | | |
|---|---|---|---|---|
| 11,072,361 | B2 | 7/2021 | Mrozek | |
| 2003/0114969 | A1 | 6/2003 | Dominke et al. | |
| 2003/0217607 | A1* | 11/2003 | Tokumoto .............. | B62D 5/049<br>73/1.09 |
| 2010/0004823 | A1* | 1/2010 | Nakatsu ................. | B62D 5/008<br>701/41 |
| 2010/0057301 | A1 | 3/2010 | Hayama et al. | |
| 2013/0218418 | A1 | 8/2013 | Ishihara | |
| 2020/0361528 | A1 | 11/2020 | Gemesi | |
| 2022/0355863 | A1* | 11/2022 | Lindenmayr ...... | B62D 15/0225 |

FOREIGN PATENT DOCUMENTS

| | | | | |
|---|---|---|---|---|
| DE | 10038167 | A1 | 2/2002 | |
| DE | 102005058224 | A1 | 6/2007 | |
| DE | 60311391 | T2 | 11/2007 | |
| DE | 102019117222 | A1 | 12/2020 | |
| DE | 112019005763 | T5 | 8/2021 | |
| DE | 102021112380 | A1 | 5/2022 | |
| KR | 100802741 | B1 | 2/2008 | |
| WO | WO2011068512 | A1 | 6/2011 | |
| WO | WO-2019179849 | A1 * | 9/2019 | ......... B62D 15/0235 |

* cited by examiner

DRIVE UNIT FOR A WHEEL ACTUATOR OF A STEER-BY-WIRE SYSTEM FOR A VEHICLE, AND METHOD FOR DETERMINING THE POSITION OF THE CONTROL ROD OF A WHEEL ACTUATOR

This nonprovisional application is a continuation of International Application No. PCT/EP2023/065542, which was filed on Jun. 9, 2023, and which claims priority to German Patent Application No. 10 2022 206 066.0, which was filed in Germany on Jun. 15, 2022, and which are both herein incorporated by reference.

BACKGROUND OF THE INVENTION

Field of the Invention

The invention relates to a drive unit for a wheel actuator of a steer-by-wire system for a vehicle. The invention also relates to a corresponding wheel actuator for a steer-by-wire system of a vehicle. Furthermore, the invention relates to a corresponding steer-by-wire system for a vehicle, as well as a suitable vehicle. In addition, the invention relates to a method for determining a position of the control rod of a wheel actuator with the aid of a corresponding drive unit.

Description of the Background Art

Future steering systems of the steer-by-wire type do not require an intermediate steering shaft between a steering wheel and a tie rod or a control rod, since the mechanical connection to the steering wheel is dispensed with. In such systems, the steering feel at the steering wheel is provided by a force feedback actuator that is connected to the steering wheel directly or through a transmission. On account of the lack of mechanical connection to the steering wheel, the position of the tie rod must be adjusted with high precision and taking into account the most stringent safety requirements. For this purpose, it is necessary to be able to unambiguously ascertain the position of the tie rod at any point in time.

Two sensors can be used in order to be able to ascertain the position of the tie rod unambiguously and with maximum safety integrity at any point in time. With known mechanical systems, one sensor can be arranged in the powerpack and one sensor on the steering column, which sensors can provide reference signals for the position of the tie rod.

In steer-by-wire systems, the steering column is no longer present. Installation of a "shaft stub" with a sensor in its place is technically possible, but not efficient in terms of simple and economical system construction.

SUMMARY OF THE INVENTION

It is therefore an object of the invention to provide an improved drive unit (so-called powerpack) for a wheel actuator of a steer-by-wire system for a vehicle that makes possible a reliable, precise, and safe determination of the position of the tie rod. A further object of the invention is to provide an improved wheel actuator for a steer-by-wire system of a vehicle. An additional object of the invention is to make available an improved steer-by-wire system for a vehicle, as well as a corresponding vehicle. Moreover, an object of the invention is to provide an improved method, in particular with regard to fault tolerance, for determining a position of the control rod of a wheel actuator with the aid of a corresponding drive unit.

The object of the invention is attained, in an example, by: a drive unit for a wheel actuator of a steer-by-wire system for a vehicle having the features of the independent device claim, a wheel actuator for a steer-by-wire system of a vehicle having the features of the additional independent device claim, a corresponding steer-by-wire system for a vehicle having the features of the independent system claim, a corresponding vehicle having the features of the further additional independent device claim, and a method for determining a position of the control rod of a wheel actuator having the features of the independent method claim.

The invention provides: a drive unit (so-called powerpack, e.g., including a motor and a controller) for a wheel actuator (a part of the steer-by-wire system on the vehicle axle) of a steer-by-wire system for a vehicle. The drive unit can comprise: a motor for providing drive power to a control rod of the wheel actuator, wherein, in particular, the control rod can likewise be called a tie rod, wherein, for example, the control rod can have different designs depending on the design of the wheel actuator, and can comprise, e.g., a steering rack, a lifting rod, or the like; a sensor device for determining a position of the control rod, wherein the sensor device has a first sensor unit and at least one second sensor unit (two or more second or secondary sensor units are possible), wherein the first sensor unit is designed to detect an angle of a rotor shaft of the motor, and wherein the second sensor unit is designed to detect an angle of an auxiliary shaft that is arranged in a mechanical operative connection to the rotor shaft; a transmission device for providing the mechanical operative connection between the rotor shaft and the auxiliary shaft, wherein, in particular, the operative connection between the rotor shaft and the auxiliary shaft is provided in such a manner that the angle of rotation of the rotor shaft and the angle of rotation of the auxiliary shaft preferably have a specific angle ratio over the stroke of the control rod; and a controller for actuating the sensor device and/or for determining a position of the control rod of the wheel actuator, wherein the first sensor unit and the second sensor unit use different measuring principles.

The solution according to the invention provides two sensor units, or two sensors, within the drive unit or the powerpack. The sensors serve to precisely determine the position of the control rod at any point in time, wherein the rotor shaft can execute multiple revolutions over a possible stroke or control travel of the control rod.

For example, the two sensor units can be designed according to the vernier principle. The vernier principle can, for example, be realized through two sensor values that change during rotation of the motor such that the position of the control rod can be unambiguously determined over its full travel via two sensor values. In this context, a magnet (as the first signal generator) can be attached in a rotationally fixed manner to the rotor shaft of the motor, and a toothed wheel for an inductive sensor (as the second signal generator) can be attached in a rotationally fixed manner to an auxiliary shaft. The operative connection, for example in the form of a rotation-angle relationship or an angle ratio, between the two signal generators can be realized through two intermeshing spur gears as part of the transmission device, which spur gears are attached to the rotor shaft and to the auxiliary shaft in a rotationally fixed manner and which each carry a signal generator. The spur gear on the auxiliary shaft can have a smaller tooth count than the spur gear on the rotor shaft so that a gear ratio can be provided and the angle of the rotor shaft and the angle of the auxiliary shaft have an unambiguous relationship to one another.

The spur gears of the transmission device can be mounted with the motor shaft in a motor housing in advantageous fashion. The sensors (as signal detectors) can be arranged directly on a printed circuit board of the controller in advantageous fashion.

The wheel actuator can be arranged on the control rod or apart therefrom, for example parallel, in this case.

According to the invention, the sensor units use different measuring principles or sensor principles. Safety-related advantages can be achieved in this way. This has the result that a simultaneous failure of both sensor units is avoided in the case of an external influence (e.g., by electromagnetic waves), which could occur with an identical sensor principle. In addition, a mutual interference of the sensors (e.g., crosstalk of the signals) can be avoided.

The first sensor unit can provide a primary function for motor control, and to this end have a higher resolution than the second sensor unit.

The second sensor unit can provide a secondary and/or redundant function for motor control and potentially have a lower resolution then the first sensor unit. The resolution of the second sensor in this case can be chosen such that the motor control can also take place on the basis of its signal, but in this case the motor control need not satisfy the highest requirements on acoustics and haptics. The purpose of the second sensor unit can be maintaining the function/availability of the motor control.

An advantage of two sensor units can furthermore reside in that mutual monitoring and/or validation of the sensor units in normal operation is made possible. These can have the following scopes, among others: validation of angle signals from the first sensor unit to the second sensor unit and vice versa, for example with the aid of a ratio between the angle signals; validation of the control rod position calculated according to the vernier principle versus other signals present in the vehicle from which the steering angle can be calculated (e.g., yaw rate, individual wheel speeds, external sensors, etc.). If the sensors are multichannel in design, the validation can also individually consider the respective individual channels of the sensors.

If a failure of the primary sensor should occur, then the second sensor can take over the position determination of the control rod.

If the second sensor has a lower resolution or signal quality than the first sensor, it can be advantageous to adapt the control behavior of the motor control. This can be accomplished in multiple ways, including: reducing the dynamic response of the higher-level control loop (steering rack position control); adding a damping component to the signal (e.g., low-pass filter); limiting of gradients and amplitudes of the signal (target steering rack position); and switching to different control parameterization that has been adapted for operation with this sensor.

It can be advantageous for high-precision calculation of the steering rack position when the position of the control rod is known from both sensors at system start. After a subsequent partial failure of the sensors, the further calculation of the position of the control rod can also take place only with that signal. A counting of the shaft rotations can additionally enter into the further calculation in this case, for example.

The calculation of the angle on the basis of the offset value from the start advantageously can normally run in the background so that the value is always available in normal operation and can also be validated against the other available signals in accordance with the above-described methods.

In addition, it can be advantageous that one or more of the items of calculated angle or position information, including an associated signal on the status of the validation, is/are sent on one or more vehicle bus systems for use by other control units in the vehicle.

Furthermore, provision can be made that the first sensor unit has a first signal generator that is connected to the rotor shaft in a rotationally fixed manner, and has a first sensor that, in particular when viewed axially, is arranged on the face end in front of the rotor shaft and opposite the first signal generator. Moreover, provision can be made that the second sensor unit has a second signal generator that is connected to the auxiliary shaft in a rotationally fixed manner, and has a second sensor that, in particular when viewed axially, is arranged on the face end in front of the auxiliary shaft and opposite the second signal generator. As a result, it can be made possible for the sensor units to use the vernier principle in order to be able to determine a precise position of the control rod at any point in time over its entire control travel.

Advantageously, the first sensor and/or the second sensor can be arranged on the controller. In this way, interconnection of the sensors can be simplified and integration into the powerpack made possible.

In addition, it can be advantageous when the first sensor unit has a higher resolution and/or signal quality than the second sensor unit. In this way, the first sensor unit can provide a primary function in the motor control.

In addition, it is possible that the first sensor unit and the second sensor unit each can have at least one of the following sensors: an inductive sensor, a magnetoresistive sensor, a Hall sensor, and/or a rotation angle sensor, etc.

Consequently, established sensors can be used for angle determination in an advantageous manner.

Additionally, it is possible that the first sensor unit and the second sensor unit each can use at least one of the following measuring principles: electromechanical, magnetic, inductive, and/or optical, etc.

Consequently, established measuring principles can be used for angle determination in an advantageous manner.

Furthermore, provision can be made that the transmission device has a main transmission element, in particular in the form of a gear, preferably a spur gear, which is connected to the rotor shaft in a rotationally fixed manner and to which the first signal generator is attached. Moreover, provision can be made that the transmission device has at least one auxiliary transmission element, in particular in the form of a gear, preferably a spur gear, which is connected to the auxiliary shaft in a rotationally fixed manner and to which the second signal generator is attached. In this way, a specific gear ratio between the gears can be provided. The gear ratio between the gears can be advantageous in order to make possible an operative connection between the rotor shaft and the auxiliary shaft so that, in particular, the angles of rotation of the rotor shaft and of the auxiliary shaft have a specific ratio over the stroke of the control rod. Consequently, a precise position determination of the control rod according to the vernier principle can be made possible.

Advantageously, the controller can have a first control unit and a second control unit. Consequently, a fault tolerance in actuating the sensors can be made possible.

In addition, it can be advantageous when the first sensor unit has at least one channel to a first control unit and at least one channel to a second control unit. Also, it can be advantageous when the second sensor unit has at least one channel to a first control unit and potentially a channel to a second control unit. In this way, a fault tolerance of the channels can be made possible so that the fault tolerance in angle determination is increased still further.

Furthermore, the invention provides: a wheel actuator for a steer-by-wire system of a vehicle, having a control rod for implementing a steering command and having a drive unit for providing drive power to the control rod in order to implement the steering command, wherein the drive unit can be designed as described above. The same advantages can be attained with the aid of the wheel actuator according to the invention as are attained with the aid of the drive unit. These advantages are referenced in full in the present case.

Moreover, the invention provides: a steer-by-wire system for a vehicle having a corresponding wheel actuator. The same advantages can be attained with the aid of the steer-by-wire system according to the invention as are attained with the aid of the drive unit. These advantages are referenced in full in the present case.

In addition, the invention provides: a vehicle, in particular a highly automated and/or autonomously driven vehicle, which potentially does not have or need not have a steering wheel, with a corresponding steer-by-wire system. The same advantages can be attained with the aid of the vehicle according to the invention as are attained with the aid of the drive unit. These advantages are referenced in full in the present case.

Furthermore, the invention provides: a method for determining a position of the control rod of a wheel actuator with the aid of a drive unit, wherein the drive unit can be designed as described above. The method has the following actions/method steps: using the first sensor unit in order to detect an angle of the rotor shaft of the motor; using the second sensor unit in order to detect an angle of the auxiliary shaft; and determining a position of the control rod of the wheel actuator with the aid of measured values from the first sensor unit and/or with the aid of measured values from the second sensor unit.

The same advantages can be attained with the aid of the method according to the invention as are attained with the aid of the drive unit. These advantages are referenced in full in the present case.

Advantageously, the measured values from the first sensor unit can be used to validate the measured values from the second sensor unit In order to be able to carry out an advantageous position determination of the control rod with increased precision, available measured values from the first sensor unit and/or available measured values from the second sensor unit can be combined.

Advantageously, an offset between measured values of the first sensor unit and the measured values of the second sensor unit (e.g., in the form of an angle ratio) can be determined at a startup of the vehicle in order to be able to continue to carry out a determination of the position of the control rod with only one sensor unit in the case of a failure of one of the sensor units. To this end, an available measured value, which can be supported by, e.g., a counting of revolutions, can be used in order to determine the position of the control rod.

Especially advantageously, the determination of the position of the control rod can be carried out with the aid of an offset between measured values of the first sensor unit and the measured values of the second sensor unit parallel to the primary determining of the position of the control rod (e.g., with the aid of the two measured values, for example according to the vernier principle) in order to be able to provide a determination of the position of the control rod with only one sensor unit, in particular immediately, in the case of a failure of one of the sensor units.

Moreover, it can be advantageous that a control method for control of the motor is adapted when the first sensor unit and/or the second sensor unit fails, wherein, in particular, at least one of the following actions is carried out when the first sensor unit fails: reduction of a dynamic response for a higher-level control, in particular of a control of the position of the control rod, adding a damping component, for example a low-pass filter, to a signal of the second sensor unit, limiting of gradients and/or amplitudes of a signal for a target position of the control rod, and/or adapting control parameters for control of the motor and/or for control of the position of the control rod.

In this way, improved control of the motor and/or control of the position of the control rod can be provided despite the failure of one of the sensor units.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
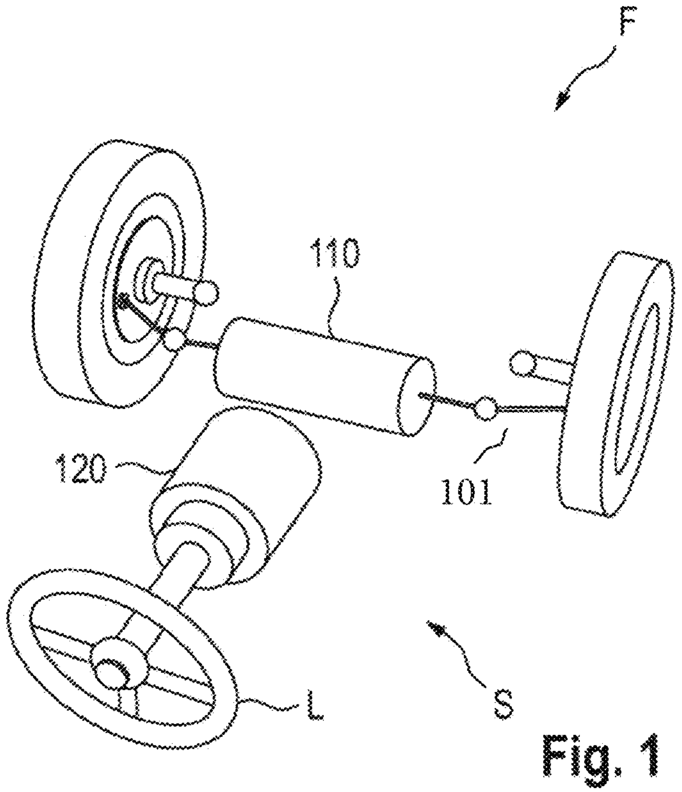
FIG. 1 shows an exemplary depiction of a vehicle having a steer-by-wire system.

FIGS. 1 to 4 serve to explain the inventive concept. FIG. 1 shows an exemplary steering system of the steer-by-wire type or, for short, a steer-by-wire system S for a vehicle F. Such a steer-by-wire system S does not require an intermediate steering shaft between a steering wheel L and a tie rod or a control rod 101, since the mechanical connection to the steering wheel L is dispensed with. In such a steer-by-wire system S, the steering feel at the steering wheel L can be provided by a force feedback actuator 120 that is connected to the steering wheel L directly or through a transmission. On account of the lack of mechanical connection to the steering wheel L, the position of the tie rod must be adjusted with high precision and taking into account the most stringent safety requirements.

In order to be able to unambiguously ascertain the position of the tie rod or the control rod 101 at any point in time, the invention proposes (see FIGS. 2 to 4): a drive unit 100 (so-called powerpack, e.g., including a motor and a controller) for a wheel actuator 110 of a steer-by-wire system S for a vehicle F. The drive unit 100 in this case has: a motor 10 for providing drive power to a control rod 101 of the wheel actuator 110, wherein, in particular, the control rod 101 can have different designs depending on the design of the wheel actuator 110, and can comprise, e.g., a steering rack, a lifting rod, or the like, wherein FIG. 1 shows the wheel actuator 110 only on the control rod 101, for example, wherein the wheel actuator 110 can, alternatively to FIG. 1, be arranged apart from the control rod 101, wherein preferably the wheel actuator 110 can be connected to the control rod 101 through a transmission; a sensor device 20 for determining a position of the control rod 101, wherein the sensor device 20 has a first sensor unit 21 and at least one second sensor unit(s) 22 (one or more second or secondary sensor units are possible), wherein the first sensor unit 21 is designed to detect an angle of a rotor shaft 11 of the motor 10, and wherein the second sensor unit 22 is designed to detect an angle of an auxiliary shaft 12 that is arranged in a mechanical operative connection to the rotor shaft 11; a transmission 30 for providing the mechanical operative connection between the rotor shaft 11 and the auxiliary shaft 12, wherein, in particular, the operative connection between the rotor shaft 11 and the auxiliary shaft 12 is provided in such a manner that the angle of rotation of the rotor shaft 11 and the angle of rotation of the auxiliary shaft 12 preferably have a specific angle ratio over the stroke of the control rod 101; and a controller 40 for actuating the sensor device 20 and/or for determining a position of the control rod 101 of the wheel actuator 110, wherein the first sensor unit 21 and the second sensor unit 22 use different measuring principles.

Figure 3:
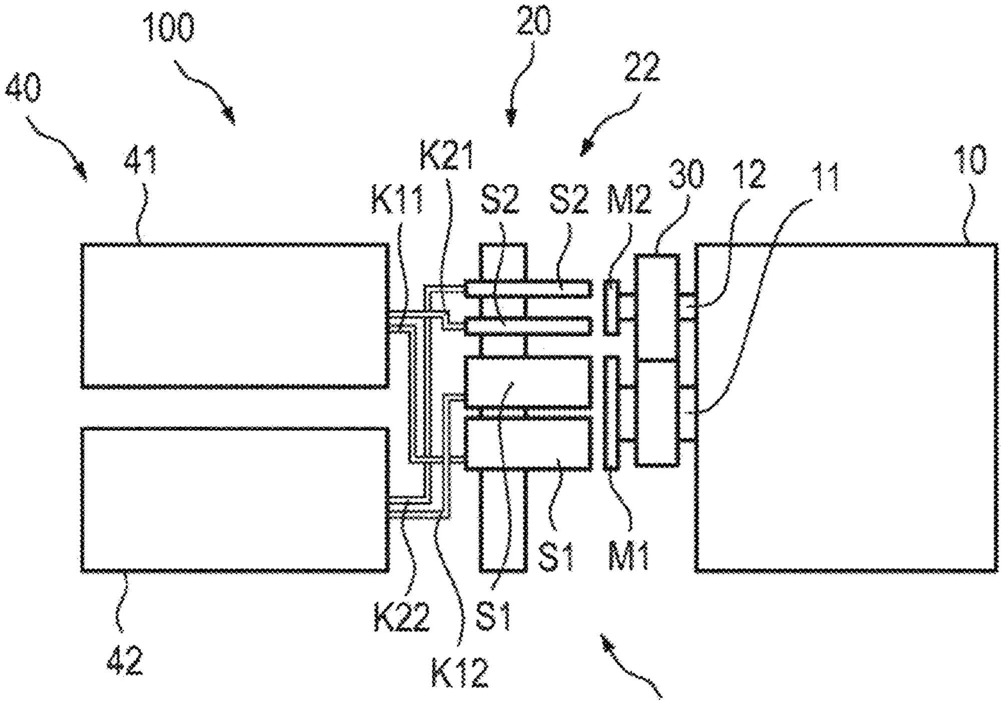
FIG. 3 shows an exemplary depiction of a sensor device of a drive unit for a wheel actuator.
Figure 4:
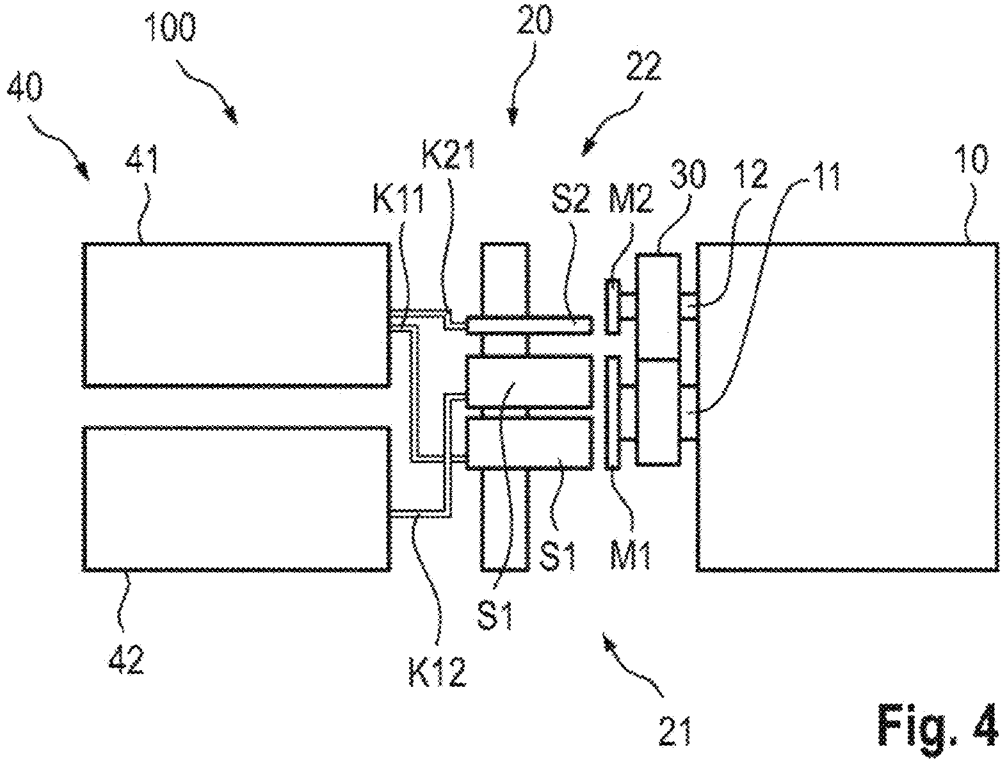
FIG. 4 shows an exemplary depiction of a sensor device of a drive unit for a wheel actuator.

As FIGS. 3 and 4 illustrate, two sensor units 21, 22 are provided with the sensor device 20. The two sensor units 21, 22 can accordingly have two sensors S1, S2. The sensor units 21, 22 can advantageously be installed within the drive unit 100, in particular within a housing of the drive unit 100. The sensors S1, S2 serve to precisely determine the position of the control rod 101 at any point in time, wherein the rotor shaft 11 can execute multiple revolutions over a possible stroke or control travel of the control rod 101.

Advantageously, the two sensor units 21, 22 can be designed according to the vernier principle. The vernier principle can, for example, be realized through two sensor values that change during rotation of the motor 10 such that the position of the control rod 101 can be unambiguously determined over its full travel via two sensor values. In this context, a magnet (as the first signal generator M1), for example, can be attached in a rotationally fixed manner to the rotor shaft 11 of the motor 10, and a toothed wheel, for example, for an inductive sensor (as the second signal generator M2) can be attached in a rotationally fixed manner to an auxiliary shaft 12. The operative connection, for example in the form of a rotation-angle relationship or an angle ratio, between the two signal generators M1, M2 can be realized through two intermeshing transmission elements 31, 32, for example in the form of spur gears, as part of the transmission device 30, which elements accordingly are attached to the rotor shaft 11 and the auxiliary shaft 12 in a rotationally fixed manner and which each carry a signal generator M1, M2. The spur gear on the auxiliary shaft 12 can, for example, have a smaller tooth count than the spur gear on the rotor shaft 11 so that a gear ratio can be provided and the angle of the rotor shaft 11 and the angle of the auxiliary shaft 12 have an unambiguous relationship or an unambiguous ratio to one another.

The transmission elements 31, 32 of the transmission 30 can be mounted with the rotor shaft 11 in a housing of the drive unit 100 in advantageous fashion. The sensors S1, S2 (as signal detectors) can be arranged directly on a printed circuit board of the controller 40 in advantageous fashion.

In accordance with the invention, the sensor units 21, 22 use different measuring principles or sensor principles: electromechanical, magnetic, inductive, optical, etc.

The sensor units 21, 22 can have the following sensors S1, S2 that are different in each case: an inductive sensor (e.g., for the first sensor S1), a magnetoresistive sensor (e.g., for the second sensor S2), a Hall sensor, a rotation angle sensor, etc.

Safety-related advantages can be achieved with the aid of different measuring principles so that a simultaneous failure of both sensor units 21, 22 is avoided in the case of an external influence (e.g., by electromagnetic waves), which could occur with an identical sensor principle. In addition, a mutual interference of the sensors S1, S2 (e.g., crosstalk of the signals) can be avoided.

The first sensor unit 21 can provide a primary function for motor control, and to this end have a higher resolution than the second sensor unit 22.

The second sensor unit 22 can provide a secondary and/or redundant function for motor control and potentially have a lower resolution then the first sensor unit 21. The resolution of the second sensor 22 in this case can be chosen such that the motor control can also take place on the basis of its signal. In the latter case, the motor control need not satisfy the highest requirements on acoustics and haptics. The purpose of the second sensor unit 22 can be maintaining the function/availability of the motor control.

An advantage of two sensor units 21, 22 can furthermore reside in that mutual monitoring and/or validation of the sensor units 21, 22 in normal operation of the wheel actuator 110 is made possible, for example: validation of angle signals from the first sensor unit 21 to the second sensor unit 22 and vice versa, for example with the aid of a ratio between the angle signals; and/or validation of the control rod position calculated according to the vernier principle versus other signals present in the vehicle F from which the steering angle can be calculated (e.g., yaw rate, individual wheel speeds, external sensors, etc.). Further, If the sensors S1, S2 are multichannel in design (see FIG. 3), the validation can also individually consider the respective individual channels K11, K12, K21, K22 of the sensors S1, S2.

If a failure of the primary sensor S1 should occur, then the second sensor S2 can take over the position determination of the control rod 101.

When the second sensor S2 has a lower resolution or signal quality than the first sensor S1, it can be advantageous to adapt the control behavior of the motor control. This can be accomplished in multiple ways, including: reducing the dynamic response of the higher-level control loop (steering rack position control); adding a damping component to the signal (e.g., low-pass filter); limiting of gradients and amplitudes of the signal (target steering rack position); switching to different control parameterization that has been adapted for operation with this sensor.

It can be advantageous for high-precision calculation of the steering rack position when the position of the control rod 101 is known from both sensors S1, S2 at system start. After a subsequent possible partial failure in one of the sensor units 21, 22, the further calculation of the position of the control rod 101 can also take place only with that signal. A counting of the shaft rotations can additionally enter into the further calculation in this case, for example.

The calculation of the angle on the basis of the offset value from the start advantageously can normally run in the background so that the value is always available in normal operation and can also be validated against the other available signals in accordance with the above-described methods.

In addition, it can be advantageous that one or more of the items of calculated angle or position information, including an associated signal on the status of the validation, is/are sent on one or more vehicle bus systems for use by other control units in the vehicle F.

Figure 2:
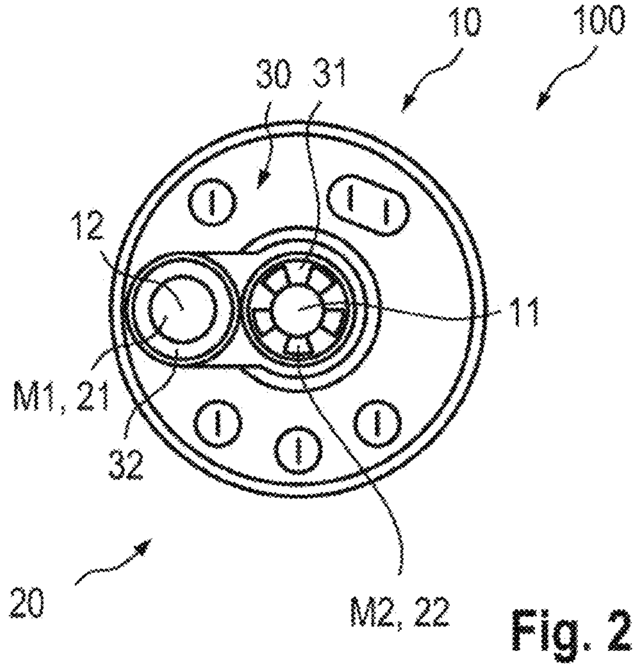
FIG. 2 shows an end view of a motor of a drive unit for a wheel actuator.

As FIGS. 2 to 4 show, the first sensor unit 21 can have a first signal generator M1 that is connected to the rotor shaft 11 in a rotationally fixed manner, and have a first sensor S1 that, in particular when viewed axially, is arranged on the face end in front of the rotor shaft 11 and opposite the first signal generator M1. Moreover, the second sensor unit 22 can have a second signal generator M2 that is connected to the auxiliary shaft 12 in a rotationally fixed manner, and have a second sensor S2 that, in particular when viewed axially, is arranged on the face end in front of the auxiliary shaft 12 and opposite the second signal generator M2.

As FIGS. 3 and 4 show, the first sensor S1 and/or the second sensor S2 can be arranged on the controller 40, in particular directly on the control circuit board.

As FIG. 2 shows, the transmission device 30 can have a main transmission element 31, in particular in the form of a gear, preferably a spur gear, which is connected to the rotor shaft 11 in a rotationally fixed manner and to which the first signal generator M1 is attached. Moreover, the transmission device 30 can have at least one auxiliary transmission element 32, in particular in the form of a gear, preferably a spur gear, which is connected to the auxiliary shaft 12 in a rotationally fixed manner and to which the second signal generator M2 is attached.

As FIGS. 3 and 4 illustrate, the controller 40 can have a first control unit 41 and a second control unit 42. In addition, the first sensor unit 21 can have at least one channel K11 to a first control unit 41 and at least one channel K12 to a second control unit 42. Also, the second sensor unit 22 can have at least one channel K21 to a first control unit 41 (see FIGS. 3 and 4) and potentially a channel K22 to a second control unit 42 (see FIG. 3).

In FIG. 3, a possible interconnection of the sensors S1, S2 is shown in combination with a two-channel and/or two-part controller 40. This has the advantage that both sensors S1, S2 are still available in the event of a shutdown of one control unit 41 or 42. If, moreover, a fault should occur in one of the sensors S1, S2 in this case, then the remaining sensor S1 or S2 can maintain further operation in connection with the remaining control unit 41 or 42. If, for example, a channel K11, K12, K21, K22 supplies an ASIL B relative angle signal, then the control units 41 and/or 42 can determine two ASIL D relative angles from the respective two ASIL B relative angle signals. An ASIL D absolute angle can then be determined from the two ASIL D relative angles.

In an example, the second sensor S2, whose task it is to maintain the availability of the position signal together with the first sensor S1, can be designed with only one channel (see FIG. 4). In this case, the position calculation in normal operation can be accomplished as in the example from FIG. 3, since all signals are available at the first control unit 41. If a fault-related failure or a shutdown of the second control unit 42 occurs, this situation does not change. If a shutdown of the first control unit 41 occurs, the system is capable of ensuring operation, albeit with limited availability, on the basis of the still-available angle information from the first sensor S1. In other words, measures may be required such as, e.g., driver warnings and/or a prevention of operation after a specific operating time or distance traveled. When these solutions can be implemented within the scope of the safety requirements to be met, this example represents a simpler, and thus cost-reduced, variant of the system. This example takes into account the property that a highly precise calculation of the control rod position from both sensors S1, S2 can be accomplished at system startup. Further calculation can be accomplished even with only the signal from the first sensor S1 on the basis of the knowledge of the position at startup. A counting of the sensor revolutions can also enter into the determination.

Advantages and special features within the scope of the present disclosure can be highlighted as follows, in particular: different measuring principles. In the event of external interference, e.g. by magnetic fields, it is thus significantly less probable that both sensor units 21, 22 will be interfered with at the same time; arrangement of the stationary sensor part (sensors S1, S2) in front of the rotating part (signal generator M1, M2) (see FIGS. 3 and 4); redundant construction of the sensor units 21, 22; redundant construction of the control units 41, 42; and/or validation of the sensor values from the sensor units 21, 22.

Furthermore, it is possible that the sensor device 20 can also include more than two sensor units 21, 22, which can then be geared differently from or identically to one another in order to increase the precision and/or robustness of the angle measurement/position determination.

The above explanation of the examples describes the present invention solely within the framework of examples. Individual features of the embodiments and examples can of course be combined freely with one another, insofar as is technically appropriate, without departing from the scope of the present invention.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A drive unit for a wheel actuator of a steer-by-wire system for a vehicle, the drive unit comprising:

a motor to provide drive power to a control rod of the wheel actuator;

a sensor device to determine a position of the control rod, the sensor device having a first sensor unit and at least one second sensor unit, the first sensor unit designed to detect an angle of a rotor shaft of the motor, and the at least one second sensor unit designed to detect an angle of an auxiliary shaft that is arranged in parallel to the rotor shaft and arranged in a mechanical operative connection to the rotor shaft;

a transmission to provide the mechanical operative connection between the rotor shaft and the auxiliary shaft; and a controller to actuate the sensor device and/or to determine a position of the control rod of the wheel actuator, wherein the first sensor unit and the at least one second sensor unit use different measuring principles.

2. The drive unit according to claim 1, wherein the first sensor unit has a first signal generator that is connected to a front end face of the rotor shaft in a rotationally fixed manner, and has a first sensor that, when viewed axially, is arranged to face the front end face of the rotor shaft so as to oppose the first signal generator, wherein the at least one second sensor unit has a second signal generator that is connected to a front end face of the auxiliary shaft in a rotationally fixed manner, and has a second sensor that, when viewed axially, is arranged to face the front end face of the auxiliary shaft so as to oppose the second signal generator, and wherein the first sensor and/or the second sensor are arranged on the controller.

3. The drive unit according to claim 1, wherein the first sensor unit has a higher resolution and/or signal quality than the at least one second sensor unit, wherein the first sensor unit has one of the following sensors: an inductive sensor; a magnetoresistive sensor; a Hall sensor; or a rotation angle sensor, and wherein the first sensor unit uses one of the following measuring principles: electromechanical; magnetic; inductive; or optical.

4. The drive unit according to claim 2, wherein the transmission has a main transmission element in the form of a gear, which is connected to the rotor shaft in a rotationally fixed manner and to which the first signal generator is attached, and wherein the transmission has at least one auxiliary transmission element in the form of a gear, which is connected to the auxiliary shaft in a rotationally fixed manner and to which the second signal generator is attached.

5. The drive unit according to claim 1, wherein the controller has a first control unit and a second control unit, wherein the first sensor unit has at least one channel to the first control unit and at least one channel to the second control unit, and wherein the at least one second sensor unit has at least one channel to the first control unit.

6. A wheel actuator for a steer-by-wire system of a vehicle, comprising:

the drive unit according to claim 1; and the control rod to implement a steering command;

wherein the drive unit provides drive power to the control rod in order to implement the steering command.

7. A steer-by-wire system for a vehicle with a wheel actuator according to claim 6.

8. A vehicle with a steer-by-wire system according to claim 7.

9. A method to determine a position of a control rod of a wheel actuator via a drive unit according to claim 1, the method comprising:

detecting, via the first sensor unit, the angle of the rotor shaft of the motor;

detecting, via the at least one second sensor unit, the angle of the auxiliary shaft; and determining a position of the control rod of the wheel actuator via measured values from the first sensor unit and/or with via measured values from the at least one second sensor unit.

10. The method according to claim 9, wherein the measured values from the first sensor unit are used to validate the measured values from the at least one second sensor unit.

11. The method according to claim 9, wherein measured values from the first sensor unit and the measured values from the at least one second sensor unit are combined in order to determine the position of the control rod of the wheel actuator, and wherein an offset between the measured values of the first sensor unit and the measured values of the at least one second sensor unit are determined at a startup of the vehicle in order to be able to continue to carry out the determination of the position of the control rod in the case of a failure of one of the first sensor unit or the at least one second sensor unit.

12. The method according to claim 9, wherein a control method for control of the motor is adapted when the first sensor unit fails, wherein at least one of the following actions is carried out when the first sensor unit fails:

reduction of a dynamic response for a control of the position of the control rod;

adding a damping component or a low-pass filter to a signal of the at least one second sensor unit;

limiting gradients and/or amplitudes of a signal for a target position of the control rod; or adapting control parameters for control of the motor and/or for control of the position of the control rod.

13. The drive unit according to claim 5, wherein the at least one second sensor unit has at least one channel to the second control unit.

14. The drive unit according to claim 3, wherein the second sensor unit uses one of the electromechanical, magnetic, inductive or optical measuring principles that is not used by the first sensor unit, so that the first sensor unit and the second sensor unit use different measuring principles.

* * * * *